US012596193B2

(12) United States Patent
Jang

(10) Patent No.: US 12,596,193 B2
(45) Date of Patent: Apr. 7, 2026

(54) DISTANCE MEASURING SYSTEM AND DISTANCE MEASURING METHOD

(71) Applicant: SEMES CO., LTD.,
Chungcheongnam-do (KR)

(72) Inventor: Yong Seok Jang, Chungcheongnam-do (KR)

(73) Assignee: SEMES CO., LTD.,
Chungcheongnam-do (KR)

( * ) Notice: Subject to any disclaimer, the term of this patent is extended or adjusted under 35 U.S.C. 154(b) by 1138 days.

(21) Appl. No.: 17/520,262

(22) Filed: Nov. 5, 2021

(65) Prior Publication Data

US 2022/0137212 A1     May 5, 2022

(30) Foreign Application Priority Data

Nov. 5, 2020     (KR) ........................ 10-2020-0147037

(51) Int. Cl.
| | |
|---|---|
| *G01S 17/08* | (2006.01) |
| *G01S 7/481* | (2006.01) |
| *G02B 5/10* | (2006.01) |
| *G02B 6/36* | (2006.01) |
| *G02B 27/10* | (2006.01) |

(52) U.S. Cl.
CPC ............ *G01S 17/08* (2013.01); *G01S 7/4814* (2013.01); *G02B 6/3624* (2013.01); *G02B 27/1006* (2013.01); *G02B 5/10* (2013.01)

(58) Field of Classification Search
CPC ..... G01S 17/08; G01S 7/4814; G02B 6/3624; G02B 27/1006; G02B 5/10; G02B 21/0064; G02B 27/10; G01B 2210/50; G01B 11/0608; G01B 11/02; G01B 11/026; G01B 11/024; G01J 1/0411; G01J 1/0414
USPC ........................................................ 356/624
See application file for complete search history.

(56) References Cited

U.S. PATENT DOCUMENTS

| | | | |
|---|---|---|---|
| 2001/0011842 A1 | 8/2001 | Rockl et al. | |
| 2008/0130014 A1* | 6/2008 | Rush ................. | G01B 11/0608 356/609 |
| 2009/0059244 A1* | 3/2009 | Hellstrom ............. | G01B 7/107 356/630 |
| 2018/0231658 A1 | 8/2018 | Jalilian et al. | |

(Continued)

FOREIGN PATENT DOCUMENTS

| | | | | |
|---|---|---|---|---|
| CN | 109084685 A | * | 12/2018 | ............. G01B 11/02 |
| EP | 3969930 A1 | * | 5/2020 | |
| JP | 03267708 A | | 11/1991 | |

(Continued)

*Primary Examiner* — Md M Rahman
(74) *Attorney, Agent, or Firm* — Procopio, Cory, Hargreaves & Savtich LLP

(57)     ABSTRACT

According to an exemplary embodiment of the present invention, a system for measuring a distance is disclosed. The system includes: an LED light source configured to apply light to a target of which a distance is desired to be measured; a first splitter configured to partially reflect light applied from the LED light source; optical fiber configured to apply light passing through the first splitter to the target; and a second splitter configured to reflect light reflected from the target, and the system may further include: a first sensor configured to sense light reflected from the first splitter; and a second sensor configured to sense light reflected from the second splitter.

15 Claims, 6 Drawing Sheets

(56)                    References Cited

U.S. PATENT DOCUMENTS

2018/0284238 A1 *  10/2018  Morita ................. G01C 15/002
2019/0101375 A1     4/2019  Morino et al.

FOREIGN PATENT DOCUMENTS

| JP | 2002206918 | A | 7/2002 |
|----|------------|---|--------|
| JP | 2003185466 | A | 7/2003 |
| JP | 6385779 | B2 | 9/2018 |
| JP | 2018185457 | A | 11/2018 |
| JP | 2019066343 | A | 4/2019 |
| JP | 2019203867 | A | 11/2019 |
| KR | 20030059046 | A | 7/2003 |
| KR | 1020100035376 | A | 4/2010 |
| KR | 101764868 | B1 | 8/2017 |
| KR | 1020180124085 | A | 11/2018 |
| KR | 1020200125149 | A | 11/2020 |
| TW | 200641325 | A | 12/2006 |
| WO | WO-2019127251 | A1 * | 7/2019 |

* cited by examiner

Figure 4:
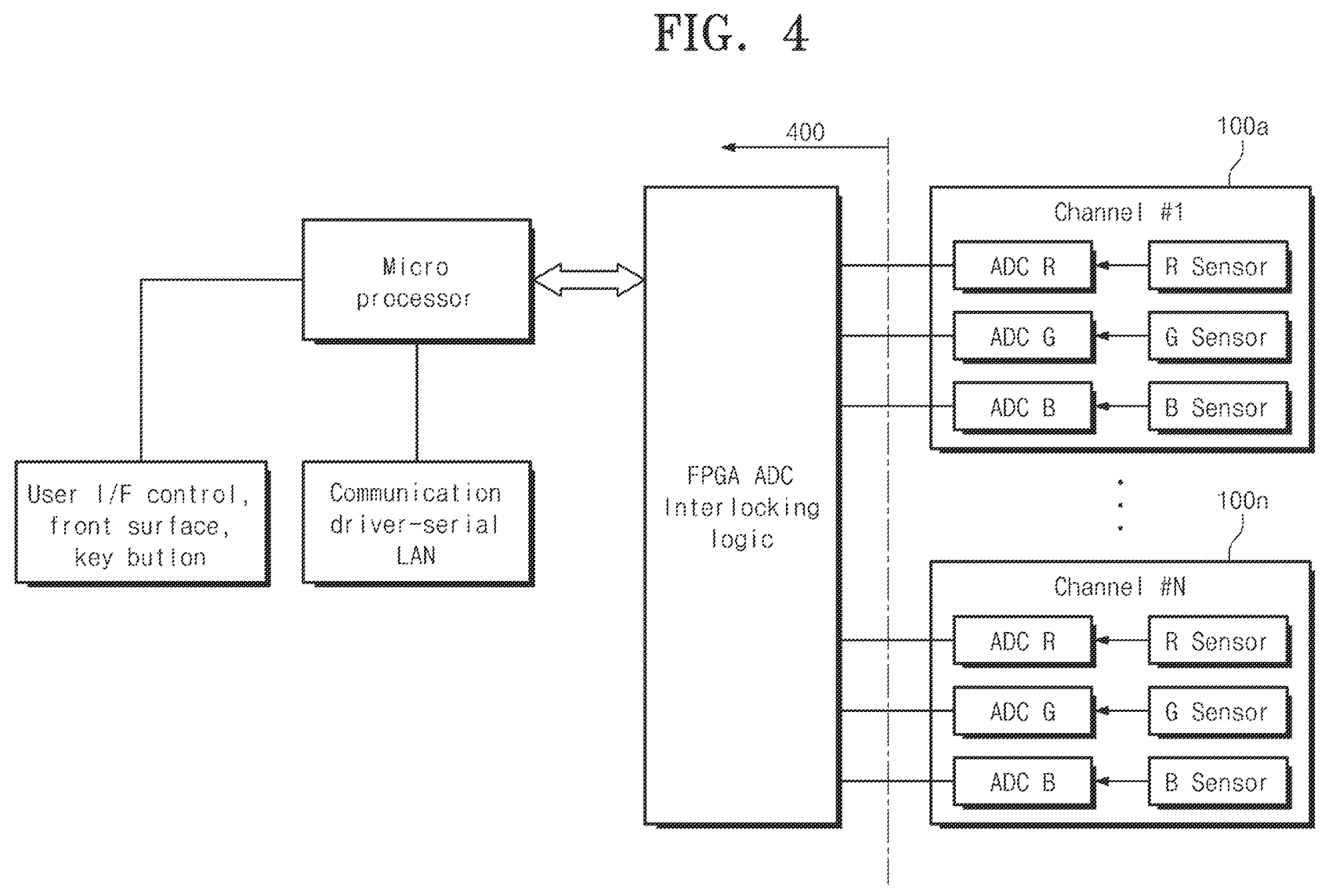

Channel #1   100a

| R Sensor | → | ADC R |
| G Sensor | → | ADC G |
| B Sensor | → | ADC B |

Channel #N   100n

| R Sensor | → | ADC R |
| G Sensor | → | ADC G |
| B Sensor | → | ADC B |

400

FPGA ADC interlocking logic

Micro processor

Communication driver-serial LAN

User I/F control, front surface, key button

1

DISTANCE MEASURING SYSTEM AND DISTANCE MEASURING METHOD

CROSS-REFERENCE TO RELATED APPLICATIONS

This application claims priority to and the benefit of Korean Patent Application No. 10-2020-0147037 filed in the Korean Intellectual Property Office on Nov. 5, 2020, the entire contents of which are incorporated herein by reference.

TECHNICAL FIELD

The present invention relates to a distance measuring system and a distance measuring method. More particularly, the present invention relates to a system and a method of measuring displacement by using an RGB light source and an RGB sensor.

BACKGROUND ART

In the related art, a confocal displacement sensor is provided with the following configurations. According to an exemplary embodiment, the confocal displacement sensor in the related art includes a white light source, a light collecting unit, an optical splitter, optical fiber, a confocal lens, a reflector, a spectroscope, an image sensor, and an image processor.

In the case of the related art, a white light source is used in order to use a light source having an even frequency distribution in a visible light band, and by using the white light source, it is possible to ensure that there is no disconnection of the constituent frequency band. The light collecting unit means a lens unit for collecting an output of the white light source and generating parallel light, and the optical splitter allows the white light source to pass through, and is provided to reflect reflective light reflected from the reflector and induce the reflected reflective light to the spectroscope. The optical fiber is provided as an optical path between the light source and the spectroscope and the confocal lens. The confocal lens is provided with an optical lens unit for generating a focal length deviation according to a frequency. The reflector means a reflective surface of a target of which displacement is desired to be measured. The spectroscope means a prism system for splitting the reflected light and converting a frequency component into positional information. The image sensor detects light split from the spectroscope and photographs an image, and the image processor means a processor for obtaining a split image from the image sensor and calculating displacement information.

When a distance is measured by using the existing confocal displacement sensor, there is a problem in that it is difficult to physically obtain a light source having even spectral density in the visible light band. Also, there is a problem in high cost, an increased size, and heating. Further, in the existing case there is a problem in that a size of the spectroscope is increased due to the use of the prism. Further, since the image sensor and the image processor are used for analysis, a high-resolution and high-speed image sensor needs to be used, thereby causing a problem in that cost is increased, and further, there is a problem in that cost of the image processor, such as an FPGA and a DSP, is also increased for the image sensor interlocking and the high-speed image processing.

2

SUMMARY OF THE INVENTION

The present invention has been made in an effort to provide a distance measuring system which is effective in terms of cost and size.

The problem to be solved by the present invention is not limited to the above-mentioned problems, and the problems not mentioned will be clearly understood by those skilled in the art from the present specification and the accompanying drawings.

An exemplary embodiment of the present invention discloses a system for measuring a distance.

The system includes: an LED light source configured to apply light to a target of which a distance is desired to be measured; a first splitter configured to partially reflect light applied from the LED light source; optical fiber configured to apply light passing through the first splitter to the target; and a second splitter configured to reflect light reflected from the target, and the system may further include: a first sensor configured to sense light reflected from the first splitter; and a second sensor configured to sense light reflected from the second splitter.

According to the exemplary embodiment, the system may further include a confocal lens disposed between the optical fiber and the target.

According to the exemplary embodiment, the system may further include: a first light collecting lens disposed between the LED light source and the first splitter; and second light collecting lens disposed between the second splitter and the optical fiber.

According to the exemplary embodiment, the system may further include a calculating unit configured to calculate displacement of the target by comparing a measurement value of the first sensor and a measurement value of the second sensor.

According to the exemplary embodiment, the calculating unit may further include a converter which converts the measurement values of the first sensor and the second sensor into a digital form.

According to the exemplary embodiment, the calculation of the displacement in the calculating unit may be processed by calculating a position of a peak point by using the total amount of response in each of the first sensor and the second sensor.

According to the exemplary embodiment, the calculating unit may include a microprocessor.

According to the exemplary embodiment, the LED light source uses an RGB light source.

According to the exemplary embodiment, the number of confocal lenses configured is three.

Another exemplary embodiment of the present invention discloses a system for measuring a distance.

The system may include: a sensor probe; a head configured to apply light in proximity to a target; and optical fiber configured to connect the sensor probe and the head, in which the head includes a confocal lens, and the sensor probe includes: an LED light source configured to apply light to the target of which a distance is desired to be measured; a first splitter configured to partially reflect light applied from the LED light source; a second splitter configured to reflect light reflected from the target; a first sensor configured to sense light reflected from the first splitter; and a second sensor configured to sense light reflected from the second splitter.

Another exemplary embodiment of the present invention discloses a method of measuring a distance by using an LED light source.

The method may include: applying the LED light source to a target; primarily receiving a light source applied from the LED light source; secondarily receiving light reflected from the target; and measuring displacement of the target by comparing the primarily received light and the secondarily received light.

According to the exemplary embodiment, the primarily receiving of the light source applied from the LED light source and the secondarily receiving of the light reflected from the target are performed by a first sensor and a second sensor, respectively.

According to the exemplary embodiment, in the measuring of the displacement of the target by comparing the primarily received light and the secondarily received light, values measured in the first sensor and the second sensor may be converted into a digital form and a position of a peak point may be calculated by using the total amount of response in each of the first sensor and the second sensor to calculate the displacement.

According to the exemplary embodiments of the present invention, there is disclosed the distance measuring system effective in terms of cost and size.

The effect of the present invention is not limited to the foregoing effects, and the not-mentioned effects will be clearly understood by those skilled in the art from the present specification and the accompanying drawings.

BRIEF DESCRIPTION OF THE DRAWINGS

FIG. 2 is a diagram illustrating a configuration of a sensor probe according to the exemplary embodiment of the present invention.

FIG. 4 is a diagram illustrating a configuration of a calculating unit according to the exemplary embodiment of the present invention.

DETAILED DESCRIPTION

Figure 1:
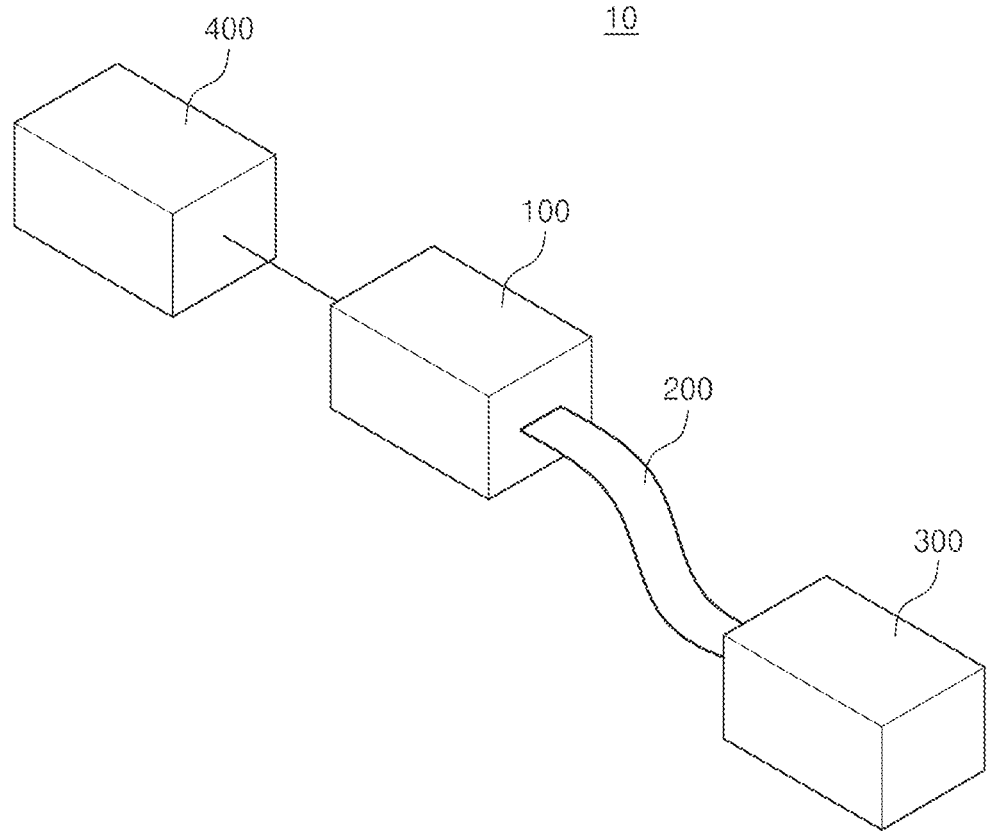
FIG. 1 is a diagram illustrating a distance measuring system according to an exemplary embodiment of the present invention.

Advantages and characteristics, and a method for achieving them will be clear when exemplary embodiments described in detail with reference to the accompanying drawings are referred to. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims.

Unless defined, all terms (including technical and scientific terms) used herein have the same meaning as the meaning commonly accepted by common skill in the related art to which the present invention belongs. Terms defined by the general dictionaries may be interpreted as having the same meaning as in the related art and/or in the text of the present application, and the terms will not be conceptualized or interpreted overly formal even if the term is not a clearly defined expression here.

Terms, such as first and second, are used for describing various constituent elements, but the constituent elements are not limited by the terms. The terms are used only to discriminate one constituent element from another constituent element. For example, without departing from the scope of the invention, a first constituent element may be named as a second constituent element, and similarly a second constituent element may be named as a first constituent element.

Singular expressions used herein include plurals expressions unless they have definitely opposite meanings in the context. Accordingly, shapes, sizes, and the like of the elements in the drawing may be exaggerated for clearer description.

The terms used in the present specification is for the purpose of describing exemplary embodiments, and do not intend to limit the present invention. In the present specification, a singular form includes a plural form as well, unless otherwise mentioned. A term "include" and/or various conjugations of this verb do not exclude the existence or an addition of one or more other compositions, components, constituent elements, steps, operations, and/or devices, in addition to the mentioned composition, component, constituent element, step, operation, and/or device. In the present specification, the term "and/or" indicates each of the listed configurations or various combinations thereof.

The term "~ unit" used in the present specification is a unit for processing at least one function or operation, and may mean, for example, a hardware element, such as an FPGA or an ASIC. However, the "~ unit" is not limited to software or hardware. The "~ unit" may also be configured to be included in an addressable storage medium, and may be configured to reproduce one or more processors.

Accordingly, as an example, the "~ unit" includes components, such as software components, object-oriented software components, class components, and task components, and processes, functions, attributes, procedures, subroutines, segments of a program code, drivers, firmware, micro-codes, circuits, data, database, data structures, tables, arrays, and variables. The constituent elements and the function provided in the "~ unit" may be separated and performed by the plurality of constituent elements and "~ unit", and may also be combined with other additional constituent elements.

FIG. 1 is a diagram illustrating a distance measuring system 10 according to an exemplary embodiment of the present invention.

The distance measuring system 10 according to FIG. 1 may include a sensor probe 100, optical fiber 200, a head 300, and a calculating unit 400. According to the exemplary embodiment, the distance measuring system 10 according to the present invention may include the plurality of sensor probes 100, the plurality of optical fibers 200, the plurality of heads 300, and one calculating unit 400. According to the exemplary embodiment, the sensor probe 100, the optical fiber 200, and the head 300 may be configured as one set, and the calculating unit 400 may be connected with the plurality of sets of the sensor probe 100, the optical fiber 200, and the head 300.

Hereinafter, each constituent element will be described in more detail with reference to the drawings.

Figure 2:
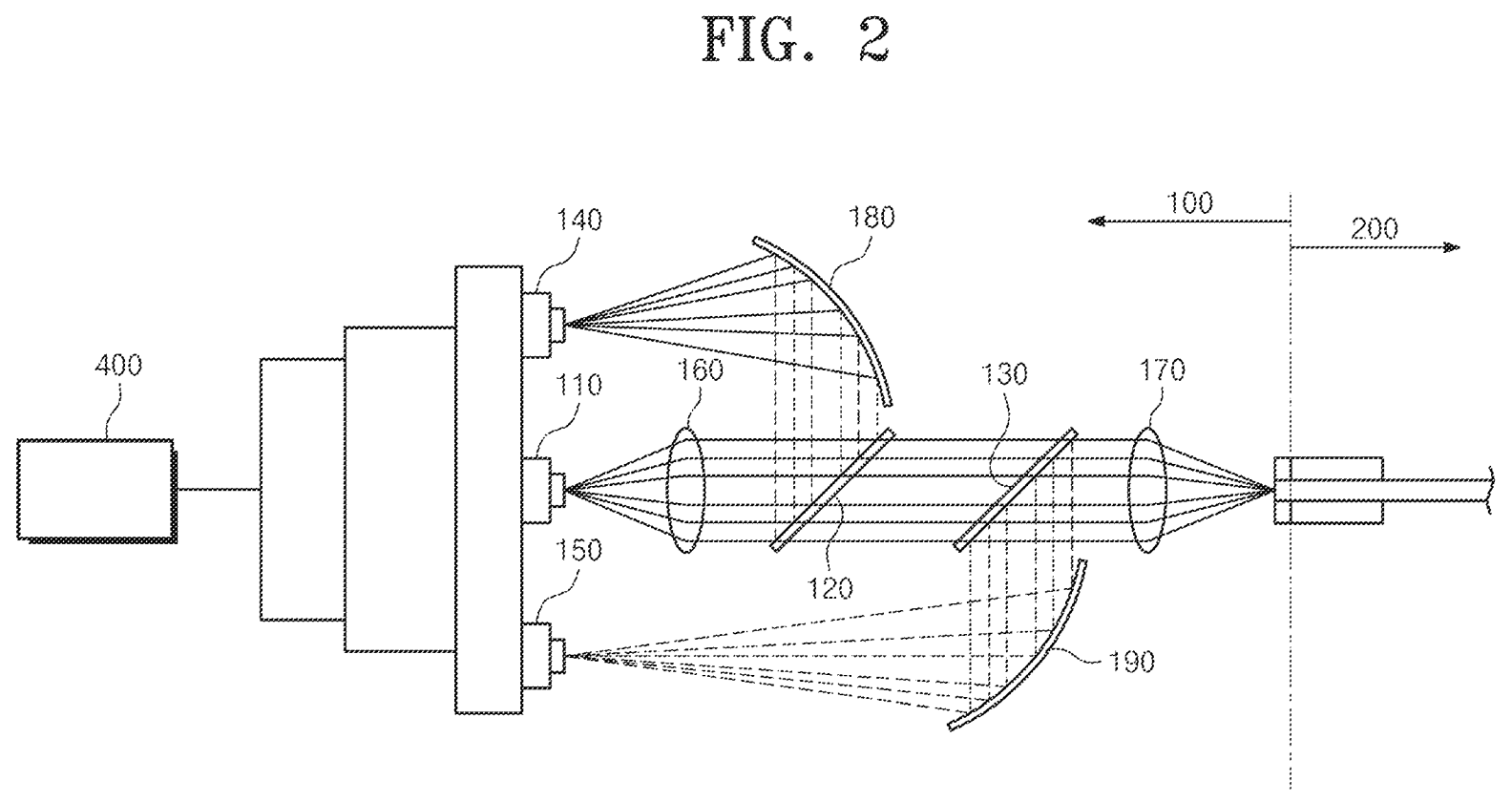

FIG. 2 is a diagram illustrating a configuration of the sensor probe 100 according to the exemplary embodiment of the present invention.

The sensor probe 100 according to FIG. 2 may include an LED light source 110. According to the present invention, light may be applied to a target of which a distance is desired to be measured by using the LED light source 110. The LED light source 110 may include an RGB light source. According to the exemplary embodiment, the LED light source 110 may be formed of a high-brightness LED including R, G, and B. The LED light source 110 may apply white light in which R, G, and B are mixed to the target. A first splitter 120 which partially reflects the light applied from the LED light source 110 may be disposed on a path along which the light derived from the LED light source 110 travels. The first splitter 120 may reflect some light and allow the remaining light to pass through. According to the exemplary embodiment, the first splitter 120 may reflect about 10% of the light and allow 90% of the light to pass through. The light passing through the first splitter 120 may be applied to the target of which the distance is desired to be measured through the optical fiber 200. The light reflected from the target may be applied to a second sensor 150 through a second splitter 130. The second splitter 130 may reflect the light reflected from the target to the second sensor 150. According to the exemplary embodiment, the second splitter 130 may reflect the light reflected from the target by 100%. That is, according to the present invention, instead of the spectroscope, the second splitter 130 which collects the reflected light and transmits the collected light to the RGB sensor may be included.

On a plane on which the LED light source 110 is disposed, a first sensor 140 for sensing the light reflected from the first splitter 120 and the second sensor 150 for sensing the light reflected from the second splitter 130 may be disposed together.

The first sensor 140 and the second sensor 150 may be the RGB sensor. Further, the LED light source 110 may be the RGB light source. According to the present invention, the first sensor 140 may sense the light applied through the LED light source 110, the second sensor 150 may sense the light reflected by using the object as a reflective surface, and displacement of the target may be measured by using the values measured through the RGB sensors, respectively.

The first sensor 140 and the second sensor 150 may detect the light reflected from the first splitter 120 and the second splitter 130. The first sensor 140 may be the sensor for reference. The second sensor 150 may be the sensor for measurement.

The calculating unit 140 may convert the values measured in the first sensor 140 and the second sensor 150 into digital data, and calculate the displacement by using the converted data. The detailed calculating method through the calculating unit 400 will be described below with reference to FIGS. 4 and 5.

Referring to FIG. 2, the distance measuring system 10 according to the present invention may include a first light colleting lens 160 disposed between the LED light source 110 and the first splitter 120 and a second light colleting lens 170 disposed between the second splitter 130 and the optical fiber 200. The first light collecting lens 160 may perform a function of collecting light discharged from the LED light source 110 and applying the collected light to the first splitter 120. The second light collecting lens 170 may perform a function of collecting light reflected from the target and applying the collected light to the second splitter 130.

Referring to FIG. 2, a first spherical mirror 180 is disposed between the first splitter 120 and the first sensor 140 to form a path in which the light reflected from the first splitter 120 may be sensed by the first sensor 140. A second spherical mirror 190 is disposed between the second splitter

130 and the second sensor 150 to form a path in which the light reflected from the second splitter 130 may be sensed by the second sensor 150.

Figure 3:
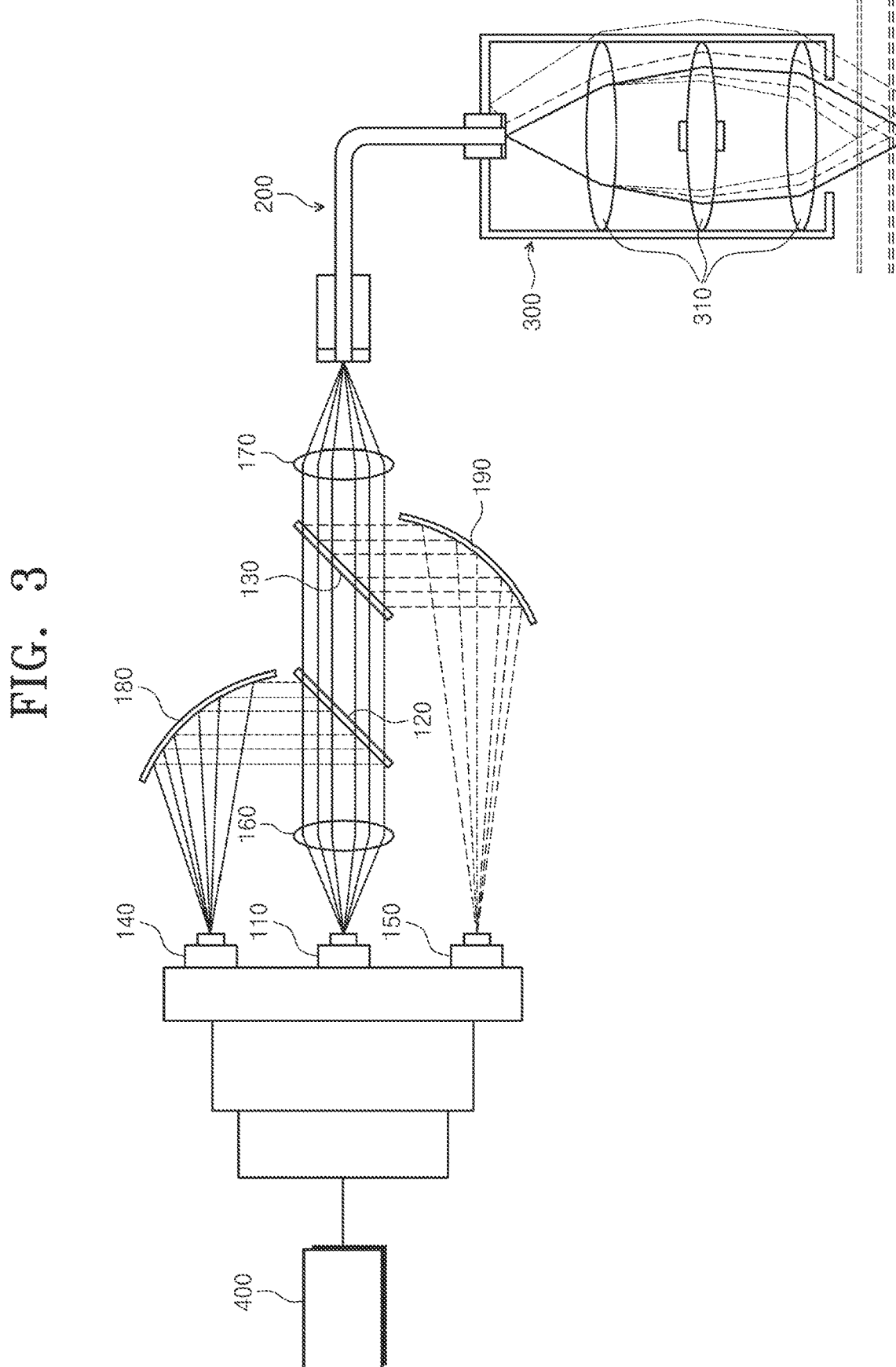
FIG. 3 is a diagram illustrating configurations of the sensor probe, optical fiber, and a head according to the exemplary embodiment of the present invention.

FIG. 3 is a diagram illustrating the configurations of the sensor probe 100, the optical fiber 200, and the head 300 according to the exemplary embodiment of the present invention. Descriptions of the parts overlapping those of FIG. 2 will be omitted. The description of the configuration of the sensor probe 100 that is the part overlapping that of FIG. 2 will be omitted.

Referring to FIG. 3, the optical fiber 200 may be connected to the sensor probe 100. The optical fiber 200 may connect the sensor probe 100 and the head 300. The optical fiber 200 is configured to connect the sensor probe 100 and the head 300 to be provided as an optical path that connects the light applied from the sensor probe 100 to the head 300. Further, when the light reflected from the target is applied through the head 300, the optical fiber 200 may provide an optical path so that the applied light passes through the sensor probe 100.

The head 300 according to the present invention may include a confocal lens 310 inside thereof. Referring to FIG. 3, the head 300 according to the present invention may include three confocal lenses 310. According to the exemplary embodiment, in the case of using the three confocal lenses 310, the most effective processing is possible. The head 300 according to the present invention has the effect of performing effective light processing by using a bi-leaf lens.

The difference between the distance measuring system 10 of the present invention according to FIGS. 2 and 3 and the existing sensor is described below.

In the present invention, the RGB light source is used, instead of the existing white light source. This is because the RGB light source is excellent in terms of cost, size, and heating. Further, the present invention does not require a stereoscope, and uses the RGB sensor and the high-speed ADC, instead of the image sensor, so that the present invention is excellent in terms of cost and size. Further, the present invention does not require an image processing processor and the image processing processor may be replaced with a microprocessor, and only the ADC interlocking is required, so that the image processing process is not necessary, and thus the present invention is efficiency in a processing process.

FIG. 4 is a diagram illustrating a configuration of the calculating unit 400 according to the exemplary embodiment of the present invention. Referring to FIG. 4, a configuration for distance measurement algorithm and high-speed multiple ADC interlocking is disclosed.

According to FIG. 4, the calculating unit 400 may include a microprocessor. According to the exemplary embodiment, the calculating unit 400 may include logic capable of interlocking an FPGA and an ADC. According to the exemplary embodiment, the sensor probe 100 may include a converter (analog digital converter). However, the converter may also be included in the calculating unit 400. Through the converter, an analog result value measured from each sensor may be changed to digital data. The calculating unit 400 interlocks the changed digital data and calculates the interlocked digital data through the microprocessor, thereby achieving an effect in that the rapid calculation is possible.

Referring to FIG. 4, it can be seen that the plurality of sensor probes 100 is connected to one calculating unit 400, so that it is possible to measure a distance for the plurality of targets.

Figure 5A:
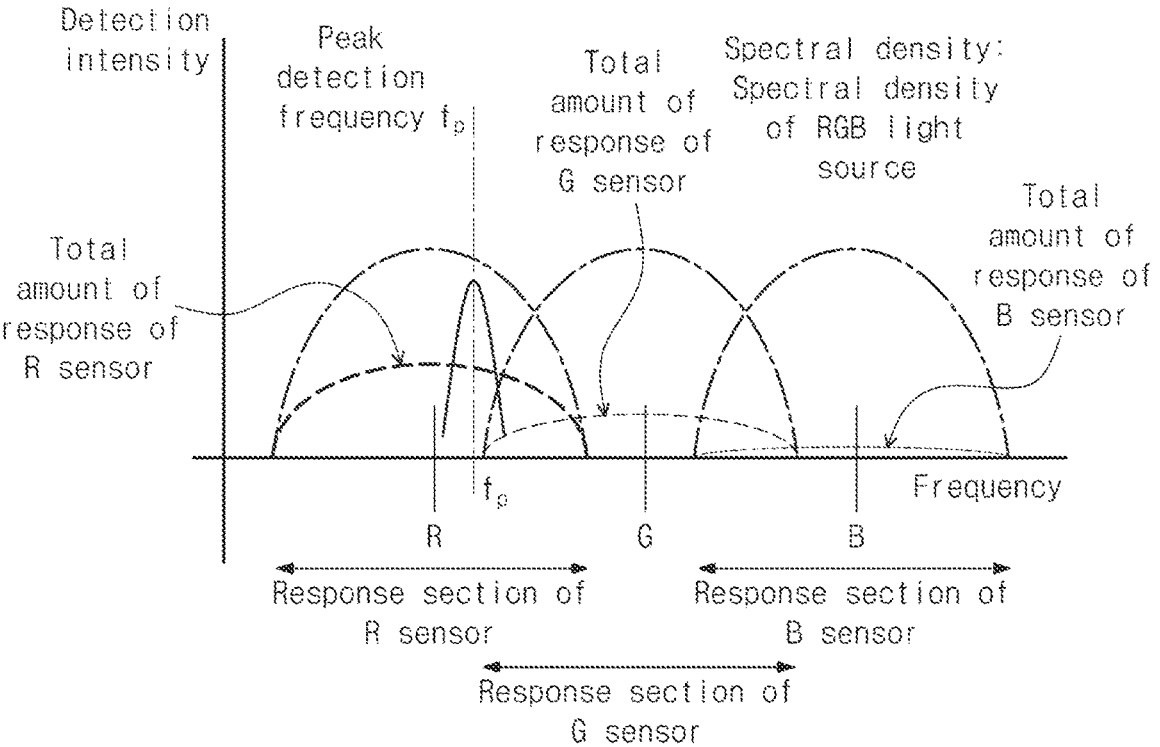
FIGS. 5A and 5B are diagrams for describing a measurement of a distance by using values measured by a first sensor and a second sensor of the present invention.
Figure 5B:
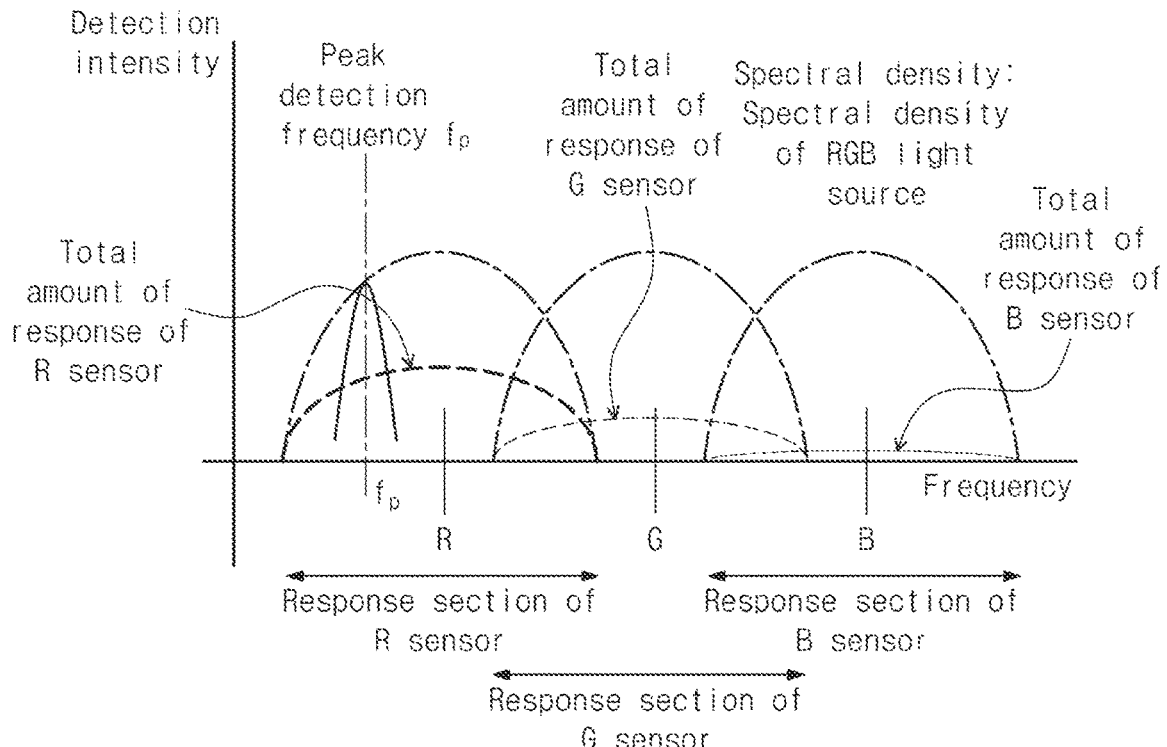

FIGS. 5A and 5B are diagrams for describing a measurement of a distance by using values measured by the first sensor 140 and the second sensor 150 of the present invention.

According to FIG. 5A, it can be seen that the total amount of response is formed in the order of Det R>Det B>Det G, and according to FIG. 5B, it can be seen that the total amount of response is formed in the order of Det R>>Det B>Det G.

FIG. 5A is the diagram representing the result measured by the first sensor 140. According to FIG. 5A, it can be seen that the position of frequency $f_p$ detecting a peak is located on the right side of the center of the R sensor. FIG. 5B is the diagram representing the result measured by the second sensor 150. According to FIG. 5B, it can be seen that the position of frequency $f_p$ detecting a peak is located on the left side of the center of the R sensor.

According to the present invention, it is possible to calculate displacement from a relative value between RGB by using the RGB light source and the RGB sensor. Light distribution of the RGB light source, the thickness of the optical fiber, a radius of an outlet radiated to the optical lens, a focal diameter, a response section of the RGB sensor, and the like are relatively large, so that a certain amount of response value exists in all of the RGB sensors. By using the certain amount of response value, it is possible to calculate the position of the peak point by using a ratio of the certain amount of response value to the total amount of response of each of the RGB sensors. Through this, it is possible to calculate the displacement of the target.

The existing confocal displacement sensor uses a method of projecting a white light source to an object (light reflector) of which a distance is to be measured through the optical fiber 200 and the lens, and detecting a maximum reflection frequency by a difference in a lens refractive index for each frequency band of the light source to measure a distance. The present invention uses the method of calculating displacement from a relative value between RGB by using the RGB light source and the RGB sensor. FIG. 5 is a diagram illustrating the RGB light source and the reflection peak frequency, and the total amount of response to the RGB sensor according to the RGB light source and the reflection peak frequency. The distance may be converted by using the table of the total response amount ratio of each of the R, G, B sensors for each displacement.

Figure 6:
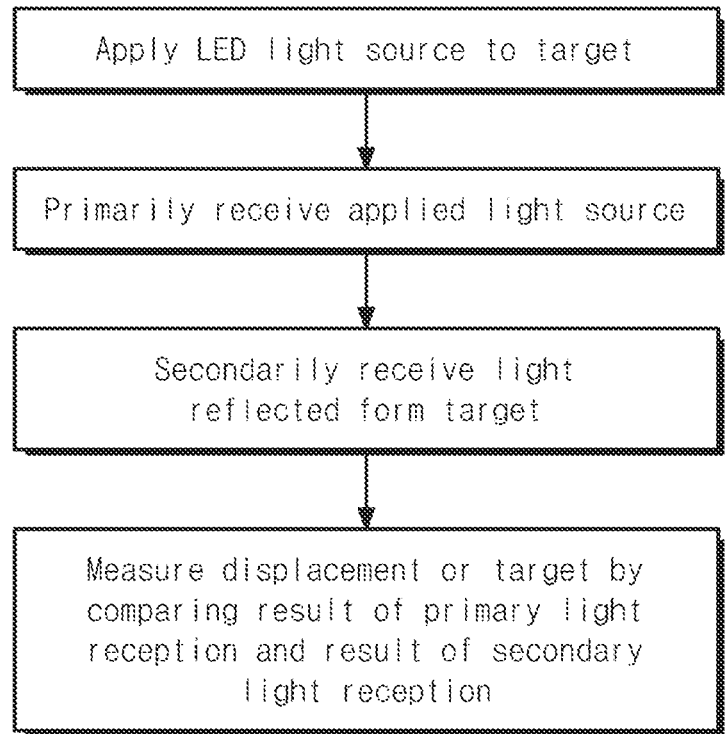
FIG. 6 is a flowchart illustrating a distance measuring method according to an exemplary embodiment of the present invention.

FIG. 6 is a flowchart illustrating a distance measuring method according to an exemplary embodiment of the present invention.

The distance measuring method according to the exemplary embodiment of the present invention may be performed by using the distance measuring system 10 disclosed in the present invention. According to the distance measuring method according to the present invention, the LED light source 110 may be applied to a target, the light source applied from the LED light source 110 may be primarily received, and light reflected from the target may be secondarily received. In this case, the primary light reception of the light source applied from the LED light source 110 may be implemented through the first sensor 140, and the secondary light reception of the light source reflected from the target may be implemented through the second sensor 150. According to the present invention, it is possible to measure displacement of the target by comparing the primarily received light and the secondarily received light.

In this case, in the displacement measuring method, the displacement may be calculated by converting the values measured in the first sensor 140 and the second sensor 150 into a digital form, and calculating a position of a peak point by using the total amount of response in each of the first sensor 140 and the second sensor 150.

The foregoing exemplary embodiments are presented for helping the understanding of the present invention, and do not limit the scope of the present invention, and it should be understood that various modified exemplary embodiments from the foregoing exemplary embodiments are also included in the scope of the present invention. The drawings provided in the present invention only show the optimum exemplary embodiment of the present invention. The technical scope of the present invention will be defined by the technical spirit of the accompanying claims, and it should be understood that the technical sprit of the present invention is not limited to the literal description of the claims itself, but substantially extends to the invention of an equivalent scope of the technical value.

What is claimed is:

1. A system for measuring a distance, the system comprising:
   an LED light source that applies an RGB light source configured to apply light to a target of which a distance is desired to be measured, wherein the LED light source applies white light in which R, G, and B are mixed;
   a first splitter configured to partially reflect light applied from the LED light source;
   an optical fiber configured to apply light passing through the first splitter to the target;
   a second splitter configured to reflect light reflected from the target;
   a first sensor comprising an RGB sensor configured to sense light reflected from the first splitter; and
   a second sensor comprising an RGB sensor configured to sense light reflected from the second splitter,
   a processor coupled to a memory device and configured to calculate displacement of the target by calculating a position of a peak point using a total amount of response in each of the first sensor and the second sensor based on values measured through the RGB sensors.

2. The system of claim 1, further comprising: a confocal lens disposed between the optical fiber and the target.

3. The system of claim 2, further comprising:
   a first light collecting lens disposed between the LED light source and the first splitter; and
   a second light collecting lens disposed between the second splitter and the optical fiber.

4. The system of claim 3, further comprising:
   a processor coupled to a memory device and configured to calculate the displacement of the target by comparing a measurement value of the first sensor and a measurement value of the second sensor.

5. The system of claim 4, wherein the processor further includes a converter which converts the measurement values of the first sensor and the second sensor into a digital form.

6. The system of claim 5, wherein the calculation of the displacement in the processor is processed by calculating a position of a peak point by using a ratio of response values to a total amount of response of each of the RGB sensors in each of the first sensor and the second sensor.

7. The system of claim 6, wherein the processor includes a microprocessor.

8. The system of claim 2, wherein a number of confocal lenses configured is three.

9. A system for measuring a distance, the system comprising:
   a sensor probe;

a head configured to apply light in proximity to a target; and an optical fiber configured to connect the sensor probe and the head, wherein the head includes a confocal lens, wherein the sensor probe includes:

an LED light source that applies an RGB light source configured to apply light to the target of which a distance is desired to be measured, wherein the LED light source applies white light in which R, G, and B are mixed;

a first splitter configured to partially reflect light applied from the LED light source;

a second splitter configured to reflect light reflected from the target;

a first sensor comprising an RGB sensor configured to sense light reflected from the first splitter; and a second sensor comprising an RGB sensor configured to sense light reflected from the second splitter, a processor coupled to a memory device and configured to calculate displacement of the target by calculating a position of a peak point using a total amount of response in each of the first sensor and the second sensor based on values measured through the RGB sensors.

10. The system of claim 9, wherein the sensor probe further includes:

a first light collecting lens disposed between the LED light source and the first splitter; and a second light collecting lens disposed between the second splitter and the optical fiber.

11. The system of claim 10, wherein the processor is configured to calculate the displacement of the target by comparing a measurement value of the first sensor and a measurement value of the second sensor.

12. The system of claim 11, wherein the processor further includes a converter which converts the measurement values of the first sensor and the second sensor into a digital form.

13. The system of claim 12, wherein the calculation of the displacement in the processor is processed by calculating a position of a peak point by using a ratio of response values to a total amount of response of each of the RGB sensors in each of the first sensor and the second sensor.

14. The system of claim 13, wherein the processor includes a microprocessor.

15. The system of claim 10, wherein a number of confocal lenses configured is three.

* * * * *